United States Patent [19]

Schnee et al.

[11] 4,076,662

[45] Feb. 28, 1978

[54] MODIFIED AMINOPLAST COMPOSITIONS

[75] Inventors: Karl Schnee, Maintal; Steffen Piesch, Oberursel, Taunus; Dieter Tichy, Frankfurt am Main, all of Germany

[73] Assignee: Cassella Farbwerke Mainkur Aktiengesellschaft, Germany

[21] Appl. No.: 750,859

[22] Filed: Dec. 15, 1976

[30] Foreign Application Priority Data

Dec. 23, 1975 Germany .............................. 2558149

[51] Int. Cl.² .................... C08G 2/00; C08G 14/02; B32B 21/00; C08L 1/00
[52] U.S. Cl. ................................ 260/17.3; 260/30.2; 260/30.8 B; 260/32.6 R; 260/32.6 N; 260/32.6 NA; 260/33.2 R; 260/67.6 R; 260/70 R; 428/528; 428/530; 428/532
[58] Field of Search ...................... 260/32.6 R, 32.6 N, 260/32.6 NA, 67.6 R, 70 R, 33.2, 17.3, 30.2, 30.8

[56] References Cited

U.S. PATENT DOCUMENTS

| | | | |
|---|---|---|---|
| 3,194,720 | 7/1965 | Grudus et al. | 260/67.6 R |
| 3,340,218 | 9/1967 | Magne et al. | 260/32.6 R |
| 3,394,093 | 7/1968 | Salem | 260/32.6 R |
| 3,425,970 | 2/1969 | Segro et al. | 260/67.6 R |
| 3,488,310 | 1/1970 | McCombs | 260/67.6 R |
| 3,557,031 | 1/1971 | Standish et al. | 260/67.6 R |
| 3,753,934 | 8/1973 | Basel-Land et al. | 260/17.3 |
| 3,914,523 | 10/1975 | Schnee et al. | 260/70 R |
| 3,929,696 | 12/1975 | Nistri et al. | 260/17.3 |
| 3,992,338 | 11/1976 | Noyes | 260/67.6 R |
| 4,031,064 | 6/1977 | Schnee et al. | 260/67.6 R |

*Primary Examiner*—Herbert J. Lilling
*Attorney, Agent, or Firm*—Connolly and Hutz

[57] ABSTRACT

N-formyl- or N-acetyl-aminomethyl ethers make very effective plasticizers for aminoplast resins and are particularly desirable for plasticizing such resins in resin-impregnated cellulosic products.

7 Claims, No Drawings

MODIFIED AMINOPLAST COMPOSITIONS

The present invention relates to aminoplast compositions such as are conventionally used in the molding of resin-impregnated cellulosic products.

Among the objects of the present invention is the provision of novel aminoplast compositions.

Additional objects of the present invention include the provision of molded and cured resin-impregnated cellulosic laminates and other products.

The foregoing as well as further objects of the present invention will be more fully understood from the following description of several of its exemplifications.

According to the present invention aminoplasts of excellent characteristics when cured, are obtained from uncured aminoplast condensate mixed with from about 0.5 to about 40% based on its solids weight, of a plasticizing ether

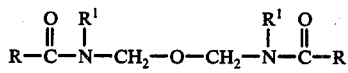

in which each R is hydrogen or methyl and each $R^1$ is hydrogen or $-CH_2OH$.

Without such plasticizing additive, the cured aminoplast resins tend to develop surface cracks, particularly when subjected to prolonged heat. Indeed a standard testing procedure identified as DIN 16,926 in Germany, is used to measure this tendency. This procedure involves heating of specimens which are fixed in a steel frame under defined bending strain at a temperature of 80° C. for 20 hours, and is also referred to in U.S. patent application Ser. No. 610,317 filed Sept. 4, 1975 in connection with a different plasticizer.

There have been no lack of attempts to eliminate or to reduce, by means of additives, the inadequate plasticity that causes such crack formation. In particular, polyalcohols such as sorbitol, sugar and aromatic sulfonamides have been suggested as practical additives of this type, in addition to those of U.S. Pat. No. 3,914,523 and Ser. No. 610,317.

However, when polyalcohols or sugar are added to the impregnating resins, the water resistance of the cured resin surfaces becomes inadequate if a sufficient plasticity has been achieved. Aromatic sulfonamides on their own are altogether inadequate for achieving good plasticity, and the esters of U.S. Pat. No. 3,914,523 and Ser. No. 610,317 are more expensive than desired.

The aminoplasts of the present invention are melamineformaldehyde and/or urea-formaldehyde condensates which are unetherified or are partly etherified with a $C_1$-$C_4$-alcohol and can be prepared by standard processes, as described for instance in Ser. No. 610,317 and the authorities cited therein. Preferred partly etherified condensates of the present invention are those formed by condensing melamine, formaldehyde and alcohol in the mol ratio 1 : 1.9 to 2.4 : 0.1 to 0.4, or urea, formaldehyde and alcohol in the mol ratio 2/3 : 1.9 to 2.4 : 0.1 to 0.4. Based on the amino groups in the amino compounds this range is 1/3 : 1.9 to 2.4 : 0.1 to 0.4.

The plasticizing ethers of the present invention are methylolated (each $R^1$ is $-CH_2OH$) or unmethylolated (each $R^1$ is H) products. The preparation of the unmethylolated products is described in Swiss Pat. No. 487,846 and in an article by Couch in Elektrochimica Acta 1964, volume 9, pages 327-336. The methylolated products can be prepared by merely adding the stoichiometric amount of aqueous formaldehyde to the unmethylolated material. One or more of the plasticizing ethers of the present invention can be added to the aminoplast mixture before, during or after the completion of the condensation reaction. They can be added in pure form, in the crude form in which they are prepared, in the form of an aqueous solution, or in the form of an aqueous solution containing formaldehyde or other ingredients, and in all cases become partly or fully methylolated when allowed to stand in a mixture containing excess formaldehyde in the event the plasticizing ether is added in unmethylolated form.

The plasticizing ethers of the present invention are best used with resin curing agents that are amine salts, for example diethanolamine acetate, ethanolamine hydrochloride, ethylenediamine acetate, ammonium thiocyanate, ammonium acetate or ethylenediamine phosphate.

It is also helpful to add to the uncured compositions of the present invention, other modifying or plasticizing agents such as for example monoalcohols or dialcohols, sugar, sulfamates, aromatic sulfonic acid amides, caprolactam and the like, in the manufacture of the resins.

In practice the preliminary condensation reaction of the aminoplasts is continued until the product has a limited dilutability with water. In some cases, for example when fairly large quantities of sulfamates are added, it is also possible for the resulting resins to have an unlimited miscibility with water.

The manufacture of resin-impregnated cellulosic products pursuant to the present invention can be along the same lines as conventionally used. Thus the aminoplast mixtures of the invention can be impregnated into paper webs and/or textile webs or other cellulosic materials such as wood or wood fibers, and then subjected to further processing. The impregnated and dried webs are pressed onto prepared sheets of wood or wood-based materials under pressures of 10–100 kp/cm²* and at temperatures of 120–180° C, it being advantageous to use multi-stack presses for the pressing operation. Laminates are manufactured analogously, as by hot pressing the foregoing impregnated webs with other webs that have been impregnated with phenolic or other resins.

* 1 kp/cm² = 1000 ponds per square centimeter = 14.22 pounds per square inch.

The laminates and coated wood-based materials manufactured in this way are distinguished, for example, in that the surfaces no longer crack after a heat treatment test carried out at 80° C. for 20 hours in accordance with DIN 16,926. Even when the temperature is increased to 90° C., cracks do not occur in the majority of cases. The curing of such products is not complicated by the additions of the present invention, and can be effected in the usual times.

EXAMPLE 1

94 kg of formaldehyde (39% strength aqueous solution), 77 kg of melamine, 1.8 kg of sodium sulfamate, 9.5 kg of methanol and 0.31 kg of sodium hydroxide solution (33% strength aqueous solution) are subjected to a condensation reaction for approximately 4 hours at 90° – 95° C until the dilutability with water is 1 : 2 as determined on a small sample. 20.5 kg of bis-(N-formylaminomethyl) ether, 37 kg of water and 62.5 g of diethylethanolamine acetate are then added to the cooled condensate solution.

A decorative paper manufactured from refined cellulose and weighing approximately 80 g/m² is impregnated with this resin solution, and is dried to a final weight of approximately 200 g/m² and a residual moisture content of 5.5 – 7.0% (5 minutes/160° C). The impregnated decorative paper thus obtained is then pressed onto a chipboard sheet in a multi-stack press, using a pressure of 18 – 22 kp/cm² at a temperature of 145° C. The dwell time in the press is 8 minutes. The product is then cooled down to 70° – 80° C and released from the platens mould. A coated chipboard sheet with outstanding surface properties is obtained. The surface of the coated chipboard sheets shows no cracks after heat treatment at 80° C for 20 hours in accordance with DIN 16,926.

If the bis-(N-formylaminomethyl) ether is omitted in the foregoing preparation and the procedure followed is otherwise as indicated, a coated chipboard sheet with poor surface properties is obtained, showing a marked formation of cracks over the whole surface on heating under identical conditions.

EXAMPLE 2

163 kg of formaldehyde (39% strength aqueous solution), 100 kg of melamine and 0.45 kg of sodium hydroxide solution (33% strength aqueous solution) are subjected to a condensation reaction at 90° C until the dilutability with water is 1 : 2. After a condensation time of 3½ hours, 24.5 kg of bis-(N-formylaminomethyl) ether are added before the condensation reaction is completed. After cooling the final condensate solution to room temperature, 45 l of water and 65 g of ethanolamine hydrochloride are added. A decorative paper weighing 120 g/m² is impregnated with this solution, and is then dried to a final weight of 270 to 290 g/m² and a residual moisture content of 6.5%. The further processing and pressing onto a chipboard sheet is carried out as described in Example 1.

The chipboard sheet with a decorative coating prepared in this way also shows no cracks after heat treatment in accordance with DIN 16,926.

EXAMPLE 3

403 g of formaldehyde in the form of a 39% strength aqueous solution and 66.5 g of bis-(N-formylaminomethyl) ether are stirred together at 85° C for 4 hours, the pH value of the resulting solution being 5.5. After cooling to 40° C, the pH value is adjusted to 8.6 with 2N sodium hydroxide solution, and 130 g of methanol, 315 g of melamine and 100 g of water are added. A condensation reaction is carried out on this mixture at 85° C until the water-dilutability is 1 : 1.5, while stirring and with continuous control of the pH value to 8.5 – 9.2. A clear solution with a solids content of approximately 65% is obtained.

After diluting with water to a concentration of approximately 52%, an overlay paper weighing approximately 30 g/m² (a highly transparent α-cellulose paper) is impregnated with this solution, and then dried to a final weight of 100 – 105 g/m² and a residual moisture content of 6.5 – 7.0%, while a decorative paper weighing 120 g/m² is impregnated and dried to a final weight of 200 – 210 g/m² and a residual moisture content of 5.5%. A laminate of the following structure is prepared, conjointly using soda kraft papers impregnated with a phenolic resin:

1 press pad (kraft paper weighing 1,200 g/m²),
1 pressure plate,
1 overlay paper (impregnated and dried as above),
1 decorative paper (impregnated and dried as above),
9 kraft papers impregnated with commercial phenolic resin,
2 release films,
9 kraft papers impregnated with commercial phenolic resin,
1 decorative paper (as above),
1 overlay paper (as above),
1 pressure plate,
1 press pad (as above) and
1 transport plate.

The assembly is pressed for 8 minutes at 140° C at a pressure of 80 kp/cm². The material is cooled down to a 70° – 80° C before release from the press. The laminated sheet produced shows no formation of cracks on any of its surfaces after heat treatment in accordance with DIN 16,926.

A mixture of 245.8 g of water and 157.2 g of paraformaldehyde may be substituted for the 403 g. of the 39% strength aqueous formaldehyde solution for use in the preparation of the resin of this example.

EXAMPLE 4

250 g of bis-(N-acetylaminomethyl) ether, 390 g of formaldehyde in the form of a 39% strength aqueous solution and 500 mg of potassium bicarbonate are stirred at 85° C for 4 hours. The pH value of the clear solution thus formed is 6.5. This solution is cooled to 40° C and the pH value is adjusted to 8.5 – 9 with 2N sodium hydroxide solution. 705 g of formaldehyde in the form of a 39% strength aqueous solution, 230 g of methanol and 770 g of melamine are then added, the resulting mixture is heated to 85° C and a condensation reaction is carried out at that temperature until the water-dilutability is 1:1, with continuous control of the pH to between 8.5 and 9.2. The solids content of the final solution is 60% and its viscosity is 30 seconds as measured by DIN 53,211 (4 mm nozzle). Its concentration is adjusted with water to 52% and this solution is then used to impregnate a decorative paper weighing 120 g/m² to a final weight of 280 – 290 g/m² and a residual moisture content of 5–6.5%. A chipboard sheet is coated with the decorative paper impregnated in this way by pressing together as in Example 1. The coated chipboard sheet thus molded shows no cracks after heat treatment at 80° C for 20 hours in accordance with DIN 16,926.

EXAMPLE 5

940 g of formaldehyde in the form of a 39% strength aqueous solution, 770 g of melamine, 230 g of methanol, 20 g of bis-(N-acetylaminomethyl) ether and 3 ml of 2N sodium hydroxide solution are mixed and heated to 85° C in the course of 40 minutes, while stirring and with continuous control of the pH value to between 8.5 and 9.2, and a condensation reaction is carried out at this temperature until the dilutability with water is 1 : 3. The solids content of the resulting clear solution is 58% and its viscosity is 20 seconds as measured by DIN 53,211 (4 mm nozzle). A further 140 g of bis-(N-acetylaminomethyl) ether are stirred into the cooled solution. After dilution with water to a concentration of 54%, the condensate solution obtained in this way is used to impregnate a decorative paper weighing 80 g/m² as indicated in Example 1 and the latter is laminated onto a wood slat. The coated slat exhibits properties similar to the coated chipboard sheet obtained in Example 1.

EXAMPLE 6

940 g of formaldehyde in the form of a 39% strength aqueous solution and 150 g of bis-(N-formyl-N-methylolaminomethyl) ether are stirred together at 85° C for 4 hours. The pH value of the resulting solution is 5.5 and, after cooling to 40° C, is adjusted to 8.5 with 2N sodium hydroxide solution, after which 230 g of methanol and 770 g of melamine are added. A condensation reaction is carried out at 85° C, while stirring and with continuous control of the pH value to between 8.5 and 9.2, until the dilutability with water is 1 : 05. A clear condensate solution with a solids content of 65% and a viscosity of 22 seconds as measured by DIN 53,211 (4 mm nozzle) is obtained. If the condensate solution obtained in this way is used according to the instructions of Example 1 to impregnate a decorative paper and the latter is then laminated onto a chipboard sheet, the resulting molded sheet exhibits properties similar to the sheet coated in Example 1.

EXAMPLE 7

940 g of formaldehyde, 39% strength aqueous solution, 770 g of melamine, 230 g of methanol and 3 ml of 2N NaOH are mixed together and then subjected to a condensation reaction at 85° C, while stirring and automatically controlling the pH value to 8.5 – 9.2, until the dilutability with water is 1 : 2.0. 113 g of bis-(N-acetylaminomethyl) ether and 4.5 g of ethanolamine hydrochloride are stirred into the resulting cooled condensate solution, followed by 200 g of water. A printed decorative paper weighing approximately 80 g/m² is impregnated with this diluted solution to a resin content of approximately 58%, and then dried to a moisture content of 7.2%. The decorative paper obtained in this way is pressed together with a chipboard sheet in a singlestack press between pressure plates with a degree of gloss of HM60 reaching a temperature of 143° C on the upper side of the work and 141° C on the lower side, an applied pressure of 20 kp/cm² and a pressing time of 70 seconds being used. The thus-molded product is released from the press before cool-down.

After cooling to room temperature, the sheet obtained in this way has a flawlessly sealed surface. Formation of cracks is not observed after heat treatment at 80° C for 20 hours in accordance with DIN 16,926. The curing of the resin in the coated surface is tested by the so-called Kiton test, which is carried out as follows:

A solution consisting of 1 l. of water, 20 ml. of a 2% strength aqueous solution of Kiton Fast Red BL (Color Index Acid Red 37; Color Index No. 17,045) and 20 ml of sulfuric acid is applied for 2 hours at room temperature on the surface of the chipboard sheet to be tested, under a watch glass. The solution is then rinsed off and the degree of staining is compared with a 7-stage scale. Strong staining corresponds to poor curing and is given the highest numbers, while a slight stain or none at all corresponds to good curing and is given the lowest numbers.

The second best stage (stage 2) on the curing scale is achieved in the present case.

EXAMPLE 8

940 g of formaldehyde (39% strength aqueous solution), 770 g of melamine, 230 g of methanol and 3 ml of N NaOH are mixed together and then subjected to a condensation reaction at 85° C while controlling the pH value to 8.5 – 9.2, until a dilutability with water of 1 : 3 is reached. During the condensation reaction 40 g of bis-(N-acylaminomethyl) ether are added in the form of a 50% strength aqueous solution. The solids content of the resulting clear condensate solution is 58%.

230 g of a 55% strength aqueous solution of a ureaformaldehyde condensate with a 1 : 1 molar ratio of urea to formaldehyde, 140 ml of water and 7.6 ml of a 50% strength aqueous solution of ethanolamine hydrochloride are then added to the melamine-formaldehyde condensate solution. A decorative paper weighing 80 g/m² is then impregnated with the resulting mixture in such a way that, after drying at 130° C, a resin content of 59% (relative to the final weight of the paper) and a residual moisture content (5 minutes/160° C) of 6.7% is obtained.

The thus-impregnated paper is pressed together with a chipboard sheet in the following arrangement in a single-stack press:

Heating platen,
Press pad, asbestos weighing 1,400 g/m²,
Pressure plate with mat chrome finish,
1 decorative paper,
1 chipboard sheet,
1 decorative paper,
Pressure plate,
Press pad, asbestos weighing 1,800 g/m² and
Heating platen.

Pressing time was 70 seconds, pressing temperature (work) 141° C and applied pressure 22 kp/cm². The molded material is released from the press before cool-down.

The coated chipboard sheet produced in this way exhibits a flawlessly sealed surface, a curing stage (Kiton test scale) of 3, and does not exhibit formation of cracks after heat treatment in accordance with DIN 16,926.

A mixture of 573.3 g of water and 366.7 g of paraformaldehyde may be substituted for the 940 g. of the 39% strength aqueous formaldehyde solution for use in the preparation of the resin of this example.

EXAMPLE 9

A mixture of 200 g melamine, 305 g. formaldehyde (39% strength aqueous solution), 16 g sugar, 9.5 g caprolactam, 102 g water and 2 ml of 2N NaOH is subjected to a condensation reaction at a pH between 8.5 and 9.2, until a water-dilutability of 1 : 1.5 is reached. 14 g of a 50% strength aqueous solution of bis-(N-acylaminomethyl) ether and 2.8 ml of a 50% strength aqueous solution of ethanolamine hydrochloride are then added to the condensate solution, and further processing is carried out in accordance with the preceding example. A coated chipboard sheet with a sealed surface and a curing stage of 2 (Kiton test scale) is obtained. After heat treatment, no formation of cracks is observed.

The preferred use of the plasticizing agents of the present invention is in an amount from about 10 to about 25% by weight of the aminoplast condensation solids. When used with other plasticizing agents they desirably constitute about 50 to about 95% of the total plasticizer content.

Obviously many modifications and variations of the present invention are possible in the light of the above teachings. It is, therefore, to be understood that within the scope of the appended claims the invention may be practiced otherwise than as specifically described.

What is claimed:

1. An uncured condensate of formaldehyde with melamine and/or urea, the condensate being mixed with from about 0.5 to about 40% based on its solids weight, of a plasticizing ether

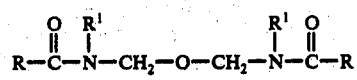

in which each R is hydrogen or methyl and each $R^1$ is hydrogen or $-CH_2OH$, the condensate being unetherified or etherified with a $C_1$ to $C_4$ alcohol.

2. The combination of claim 1 in which the plasticizing ether is present in the mixture in a proportion from about 10 to about 25% by weight of the condensate solids.

3. The combination of claim 1 in which the condensate is etherified with a $C_1$ to $C_4$ alkanol to the extent of from about 1/30 to about 4/30 ether groups per amine group.

4. The combination of claim 1 in which the mixture also contains at least one additional plasticizer and the plasticizing ether is from about 50 to about 95% of the total plasticizer content.

5. The combination of claim 4 in which the additional plasticizers are selected from the class consisting of monoalcohol, polyalcohol, sugar, sulfamate, caprolactam and aromatic sulfonamide plasticizers.

6. The combination of claim 1 in which the mixture also contains an amine salt curing accelerator.

7. The combination of claim 6 in which the curing accelerator is selected from the class consisting of diethanolamine acetate, ethanolamine hydrochloride, ethylenediamine acetate, ammonium thiocyanate, ammonium acetate or ethylenediamine phosphate.

* * * * *